United States Patent
Nakane et al.

(10) Patent No.: US 10,493,933 B2
(45) Date of Patent: Dec. 3, 2019

(54) COLLISION DETECTION DEVICE FOR VEHICLE

(71) Applicant: DENSO CORPORATION, Kariya, Aichi-pref. (JP)

(72) Inventors: Daisuke Nakane, Kariya (JP); Takatoshi Tanabe, Kariya (JP); Tomokazu Yoshida, Kariya (JP); Kouta Amano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 71 days.

(21) Appl. No.: 15/563,154

(22) PCT Filed: Mar. 24, 2016

(86) PCT No.: PCT/JP2016/001717
§ 371 (c)(1),
(2) Date: Sep. 29, 2017

(87) PCT Pub. No.: WO2016/163095
PCT Pub. Date: Oct. 13, 2016

(65) Prior Publication Data
US 2018/0079381 A1     Mar. 22, 2018

(30) Foreign Application Priority Data

Apr. 10, 2015  (JP) .................................. 2015-080690

(51) Int. Cl.
*B60R 19/48*     (2006.01)
*B60R 21/0136*   (2006.01)
(Continued)

(52) U.S. Cl.
CPC ........ *B60R 19/483* (2013.01); *B60R 21/0136* (2013.01); *B60R 19/18* (2013.01); *B60R 21/00* (2013.01); *B60R 2019/186* (2013.01)

(58) Field of Classification Search
CPC .......................... B60R 19/483; B60R 21/0136
(Continued)

(56) References Cited

U.S. PATENT DOCUMENTS 9,221,414 B2 *  12/2015  Schondorf ............ B60R 19/483
2016/0101753 A1 *  4/2016  Higashimachi ....... B60R 19/023
                                                        293/117
(Continued)

FOREIGN PATENT DOCUMENTS

DE   202011105867 U1    10/2011
DE   102013017415 A1 *   7/2014  ........... B60R 19/483
(Continued)

*Primary Examiner* — Jason S Morrow
(74) *Attorney, Agent, or Firm* — Harness, Dickey & Pierce, P.L.C.

(57) ABSTRACT

A collision detection device for a vehicle includes: a bumper absorber disposed on a front side of a bumper reinforcement in a bumper of the vehicle; a detection tube component mounted in a groove portion defined in the bumper absorber to extend in a width direction of the vehicle, a hollow part being defined in the detection tube component; and a pressure sensor that detects a pressure in the hollow part of the detection tube component, and detects a collision of an object to the bumper based on a pressure detection result by the pressure sensor. The detection tube component is mounted in the groove portion in a state where the detection tube component has at least one or more cove curve portions curved in an up-down direction of the vehicle.

19 Claims, 6 Drawing Sheets (51) Int. Cl.
*B60R 21/00* (2006.01)
*B60R 19/18* (2006.01)

(58) Field of Classification Search
USPC .................................................... 293/4, 117
See application file for complete search history.

(56) References Cited

U.S. PATENT DOCUMENTS

| 2017/0043735 | A1* | 2/2017 | Yamaguchi | B60R 19/483 |
| 2017/0225637 | A1* | 8/2017 | Kamimura | B60R 19/18 |
| 2017/0274850 | A1* | 9/2017 | Aizawa | B60R 19/18 |
| 2018/0141515 | A1* | 5/2018 | Feeser | B60R 19/483 |
| 2019/0023206 | A1* | 1/2019 | Yoshida | B60R 19/48 |

FOREIGN PATENT DOCUMENTS

| DE | 102013201592 A1 * | 8/2014 | ........ B60R 19/483 |
| JP | 2014505629 A | 3/2014 | |
| JP | 2015030323 A | 2/2015 | |
| JP | 2015131540 A | 7/2015 | |
| JP | 2016175487 A | 10/2016 | |

* cited by examiner

COLLISION DETECTION DEVICE FOR VEHICLE

CROSS REFERENCE TO RELATED APPLICATIONS

This application is a U.S. National Phase Application under 35 U.S.C. 371 of International Application No. PCT/JP2016/001717 filed on Mar. 24, 2016 and published in Japanese as WO 2016/163095 A1 on Oct. 13, 2016. This application is based on and claims the benefit of priority from Japanese Patent Application No. 2015-080690 filed on Apr. 10, 2015. The entire disclosures of all of the above applications are incorporated herein by reference.

TECHNICAL FIELD

The present disclosure relates to a collision detection device for a vehicle, which detects a collision with a pedestrian and the like.

BACKGROUND ART

Conventionally, a vehicle is equipped with a pedestrian protection device for reducing an impact to a pedestrian in case where the pedestrian collides with the vehicle. The vehicle has a collision detection device including a sensor that is disposed in a bumper of the vehicle. When the sensor detects that a pedestrian collides with the vehicle, the pedestrian protection device is operated to reduce the impact applied to the pedestrian. A pop-up hood is one of the pedestrian protection devices. When a collision is detected, the pop-up hood raises the back end of an engine hood so as to increase the interval between the pedestrian and hard parts such as engine. The collision energy to a head of the pedestrian is absorbed using the space, such that the impact to the head of the pedestrian is reduced.

A collision detection device for a vehicle has a chamber component defining a chamber space inside, and the chamber component is arranged on the front surface of a bumper reinforcement in a bumper of the vehicle. A pressure in the chamber space is detected with a pressure sensor. If an object such as pedestrian collides to the bumper (bumper cover), the chamber component is deformed by a deformation of the bumper cover, and a pressure variation is generated in the chamber space. The pressure variation is detected by the pressure sensor such that the collision of the object to the bumper can be detected.

Recently, a tube-type collision detection device for a vehicle is proposed, which detects a collision using a tube component that is small and easy to handle, compared with the chamber-type collision detection device. The collision detection device includes a bumper absorber arranged in the bumper, a hollow tube component mounted to a groove portion defined in the bumper absorber to extend in the vehicle width direction, and a pressure sensor that detects a pressure variation in the tube component. When a pedestrian collides with a front of a vehicle, the bumper absorber deforms and absorbs the impact, and the tube component deforms at the same time. At this time, the pressure in the tube component is raised, and the pressure change is detected by the pressure sensor, such that a collision of the pedestrian to the vehicle can be detected.

PRIOR ART LITERATURES

Patent Literature

Patent Literature 1: JP 2014-505629 A

SUMMARY OF INVENTION

However, in the collision detection device for a vehicle, for example, if the impact generated by the collision with the pedestrian on the front side of the vehicle is released to the lateral side of the vehicle, the tube component may not fully be deformed at a time of the collision, at a corner portion of the bumper cover adjacent to the end in the vehicle width direction, which is inclined to the front-rear direction of the vehicle. Moreover, the tube component may not fully be deformed at a high rigidity part where the rigidity of the bumper cover or a component in the bumper is relatively high, because a load applied to the tube component becomes small at a time of the collision. In such a case, the output of the pressure sensor may become small when a pedestrian collides, and it may be difficult to secure the required output. For this reason, one subject of the present disclosure is to reduce a variation in the output by the pressure sensor depending on the collision position in the vehicle width direction in the bumper.

The present disclosure is aimed to provide a collision detection device for a vehicle, which is capable of detecting collision with high accuracy irrespective of the collision position in the vehicle width direction of the bumper.

According to an aspect of the present disclosure, a collision detection device for a vehicle includes: a bumper absorber disposed on a front side of a bumper reinforcement in a bumper of the vehicle; a detection tube component mounted in a groove portion defined in the bumper absorber to extend in a width direction of the vehicle, a hollow part being defined in the detection tube component; a pressure sensor that detects a pressure in the hollow part of the detection tube component, and detects a collision of an object to the bumper based on a pressure detection result by the pressure sensor. The detection tube component is mounted in the groove portion in a state where the detection tube component has at least one or more cove curve portions curved in an up-down direction of the vehicle.

Accordingly, since the detection tube component is mounted in the groove portion in a state where the detection tube component has at least one or more cove curve portions curved in the up-down direction of the vehicle, the collision area (namely, the cross-section area perpendicular to the collision direction) of the detection tube component becomes large at a time of the collision with an object in front of the vehicle, and the deformation amount of the detection tube component (namely, the volume crushed by the collision) can be increased. Thereby, the output of the pressure sensor can be restricted from being varied by the collision position in the vehicle width direction of the bumper. That is, the output of the pressure sensor can be improved at the position where the output of the pressure sensor may become small, because the detection tube component is disposed in the groove portion in the state where the detection tube component has the cove curve portion. Thus, the collision detection can be performed with high accuracy irrespective of the collision position in the vehicle width direction of the bumper.

DESCRIPTION OF EMBODIMENTS

First Embodiment

Figure 1:
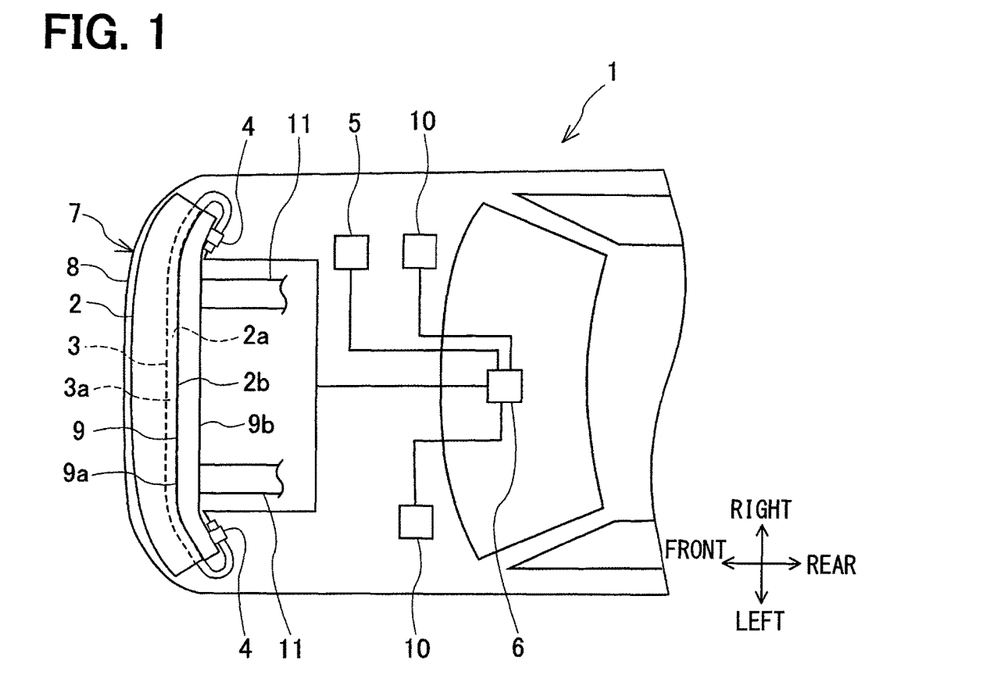
FIG. 1 is a schematic view illustrating a collision detection device for a vehicle according to a first embodiment.
Figure 2:
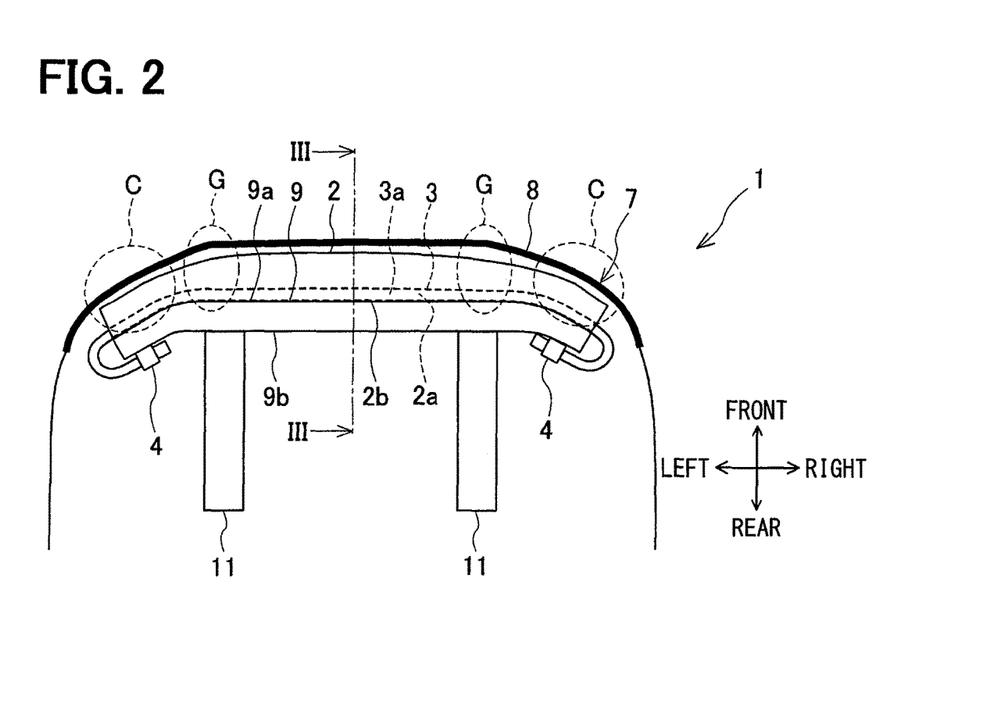
FIG. 2 is an enlarged view illustrating a bumper part of FIG. 1.
Figure 3:
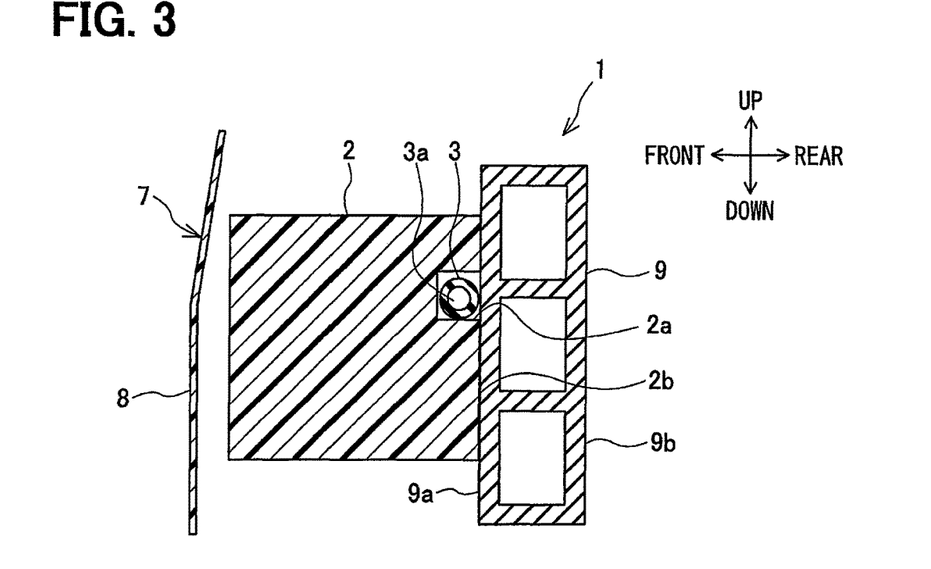
FIG. 3 is a sectional view of the bumper part taken along a line III-III of FIG. 2.

A collision detection device for a vehicle according to a first embodiment is explained with reference to FIG. 1 to FIG. 7. As shown in FIG. 1 and FIG. 2, the collision detection device 1 of this embodiment includes a bumper absorber 2, a hollow detection tube component 3, a pressure sensor 4, a speed sensor 5, and a collision detection ECU 6. The collision detection device 1 detects a collision of an object (such as pedestrian) to a bumper 7 disposed at the front of the vehicle. As shown in FIG. 3, the bumper 7 mainly includes a bumper cover 8 and a bumper reinforcement 9 in addition to the bumper absorber 2.

The bumper absorber 2 absorbs impact in the bumper 7, and is made of, for example, polypropylene foam. As shown in FIG. 3, the bumper absorber 2 is disposed at a position opposing a front surface 9a of the bumper reinforcement 9, e.g., on the front of the vehicle, and extends in the vehicle width direction. Although not illustrated, the bumper absorber 2 and the bumper reinforcement 9 are fixed and fitted by fitting parts defined in the bumper absorber 2 and the bumper reinforcement 9 respectively. Moreover, the rear surface 2b of the bumper absorber 2 and the front surface 9a of the bumper reinforcement 9 are in contact with each other.

The bumper absorber 2 has a groove portion 2a in the upper side of the rear surface 2b of the bumper absorber 2. The groove portion 2a is formed to extend along the vehicle width direction, i.e., the vehicle left-right direction, and the detection tube component 3 is mounted in the groove portion 2a. The groove portion 2a has a rectangular cross-sectional form, and extends in the vehicle width direction. The length of the groove portion 2a in the vehicle up-down direction is longer than the length (namely, outer diameter) of the detection tube component 3 in the vehicle up-down direction. Moreover, the length of the groove portion 2a in the vehicle front-rear direction is approximately the same as the outer diameter of the detection tube component 3. The cross-sectional form of the groove portion 2a is not restricted to the rectangle, and may be round or ellipse.

Figure 4:
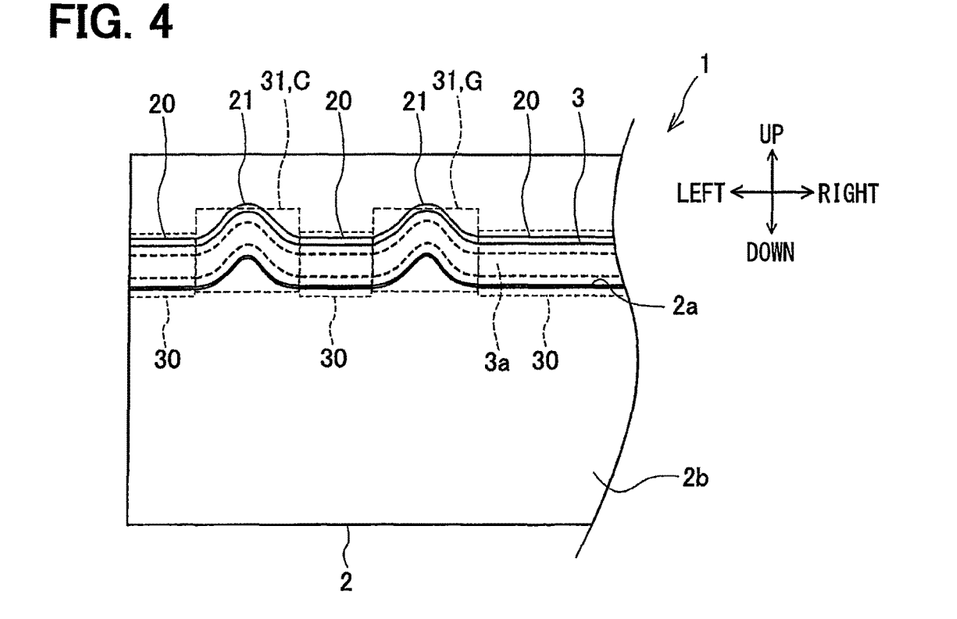
FIG. 4 is a view illustrating a detection tube component mounted to a groove portion of a bumper absorber seen from a rear side of the vehicle.
Figure 5:
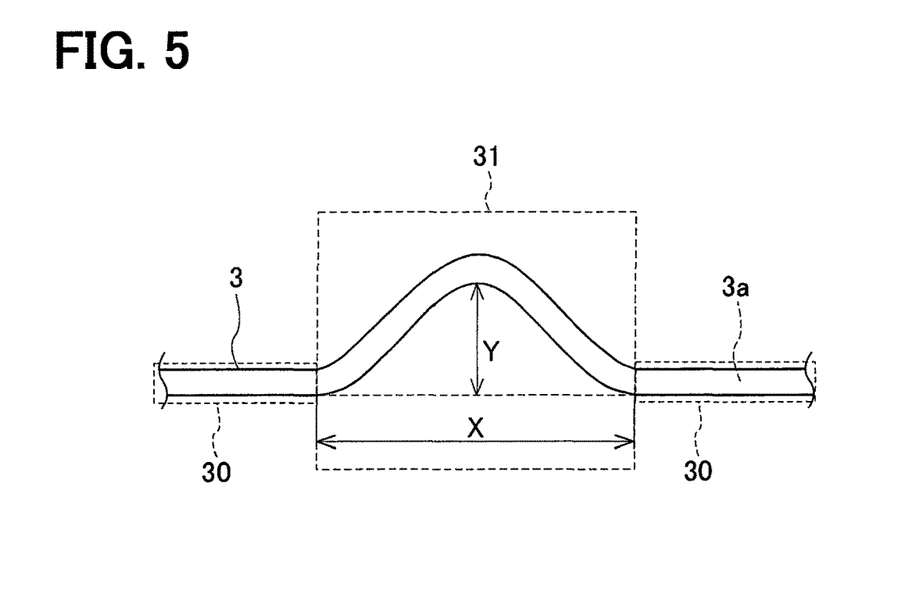
FIG. 5 is a schematic view illustrating a curve state of a cove curve portion of the detection tube component.

As shown in FIG. 4, the groove portion 2a of this embodiment has a horizontal groove portion 20 extending in the horizontal direction of vehicle, and a curve groove portion 21 curved to the upper side relative to the horizontal groove portion 20. The curve groove portion 21 is defined for mounting the detection tube component 3 in the groove portion 2a in the state where the detection tube component 3 is curved in the up-down direction.

In this embodiment, a load applied to the detection tube component 3 at the time of a collision becomes small, at a high rigidity part G where the rigidity is relatively high due to the angled shape such as a front grille (not shown), or at a corner part C of the bumper cover 8, thereby assuming that the output of the pressure sensor 4 may become small. That is, the deformation amount of the bumper absorber 2, at the time of a collision, may become small at the high rigidity part G where the rigidity of the front grille is high. Moreover, since the bumper cover 8 is round at the corner part C, if a shock generated by a collision is released to the lateral side of the vehicle, the detection tube component 3 may not fully be deformed, and the output of the pressure sensor 4 may become small.

Then, the curve groove portion 21 curved to the upper side relative to the horizontal groove portion 20 is formed at totally four places, e.g., two of the high rigidity parts G right and left where the rigidity of the front grille is high and two of the corner parts C right and left of the bumper cover 8. Thereby, at these places, the detection tube component 3 is fitted in the curve groove portion 21 of the groove portion 2a in the state where the detection tube component 3 has the cove curve portion 31. At the curve groove portion 21 and the cove curve portion 31, the cross-section area per unit length in the vehicle width direction, when seen from the front-rear direction of the vehicle, is larger than that of the horizontal groove portion 20 and the horizontal portion 30 only by a predetermined amount. Thereby, the output of the pressure sensor 4 at the time of a collision can be improved at the cove curve portion 31 of the detection tube component 3. In addition, the curvature radius of the curve groove portion 21 and the cove curve portion 31 is set as not less than 15 mm.

As shown in FIG. 1 and FIG. 2, the hollow part 3a is formed inside the detection tube component 3, and extends in the vehicle width direction, that is, in the vehicle left-right direction. The detection tube component 3 is disposed at the position opposing the front surface 9a of the bumper reinforcement 9 in the bumper 7 of the vehicle, that is, at the front side of the vehicle. The both ends of the detection tube component 3 are curved and connected to the respective pressure sensors 4 to be mentioned later, outside of the bumper reinforcement 9, at right and left in the vehicle width direction.

The detection tube component 3 has circular cross-sectional form, and is made of synthetic rubber such as silicone rubber. The detection tube component 3 has outer dimensions such as outer diameter of about 8 mm, and thickness of about 2 mm. In addition, the detection tube component 3 may be made of other material such as ethylene propylene rubber (EPDM).

In this embodiment, the detection tube component 3 is mounted in the groove portion 2*a* in the state where the detection tube component 3 has the cove curve portion 31 curved in the up-down direction of the vehicle (refer to squares surrounded by dashed line in FIG. 4) at the totally four places, e.g., two of the high rigidity parts G right and left where the rigidity of the front grille is high, and two of the corner parts C right and left of the bumper cover 8. Moreover, the detection tube component 3 has the horizontal portion 30 extending in the horizontal direction of vehicle. The cove curve portion 31 is curved to the upper side relative to the horizontal portion 30. The cross-section area per unit length in the vehicle width direction, when seen from the front-rear direction of the vehicle, is larger in the cove curve portion 31 than in the horizontal portion 30 only by a predetermined amount. That is, a distance from the horizontal portion 30 to a peak of the cove curve portion 31 (namely, a position most distant from the horizontal portion 30) in the vehicle up-down direction is set to have a predetermined length. Moreover, the length of the cove curve portion 31 in the vehicle width direction, i.e., the vehicle left-right direction, is set as about 200 mm.

The pressure sensor 4 is arranged at rear side of the front surface 9*a* of the bumper reinforcement 9. Specifically, the pressure sensor 4 is installed at two right-and-left positions adjacent to the respective left and right ends of the bumper reinforcement 9, and is fixed to the rear surface 9*b* by tightening with a non-illustrated bolt. In this embodiment, redundancy and detection accuracy are secured by installing the two pressure sensors 4 in this way.

As shown in FIG. 2, the pressure sensor 4 is connected to the right and left respective ends of the detection tube component 3, and is configured to detect the pressure in the hollow part 3*a* of the detection tube component 3. Specifically, the pressure sensor 4 is a sensor device which detects a change in pressure of gas, and detects a pressure change of air in the hollow part 3*a* of the detection tube component 3. As shown in FIG. 1, the pressure sensor 4 is electrically connected to the collision detection ECU (Electronic Control Unit) 6 through a transmission line, and outputs a signal proportional to the pressure to the collision detection ECU 6. The collision detection ECU 6 detects a collision of a pedestrian to the bumper 7 based on the pressure sensing result by the pressure sensor 4. Moreover, the collision detection ECU 6 is electrically connected to the pedestrian protection device 10.

The speed sensor 5 is a sensor device which detects the speed of the vehicle, and is electrically connected to the collision detection ECU 6 through the signal wire. The speed sensor 5 transmits a signal proportional to the speed of the vehicle to the collision detection ECU 6.

The collision detection ECU 6 includes a CPU, and controls general operations of the collision detection device 1. The collision detection ECU 6 is electrically connected to each of the pressure sensor 4, the speed sensor 5 and the pedestrian protection device 10 (refer to FIG. 1). A pressure signal is inputted from the pressure sensor 4 into the collision detection ECU 6, and a speed signal is inputted from the speed sensor 5 into the collision detection ECU 6. The collision detection ECU 6 executes a predetermined collision determination process based on the pressure signal by the pressure sensor 4 and the speed signal by the speed sensor 5. When a collision of an object such as pedestrian to the bumper 7 is detected, the pedestrian protection device 10 is activated by the collision detection ECU 6.

The bumper 7 absorbs the shock when the vehicle has a collision, and includes the bumper cover 8, the bumper absorber 2, and the bumper reinforcement 9. The bumper cover 8 is arranged to cover components of the bumper 7, and is made of plastic material such as polypropylene. The bumper cover 8 defines the appearance of the bumper 7, and defines a part of appearance of the vehicle.

The bumper reinforcement 9 is a rigid component made of metal such as aluminum, and the bumper reinforcement 9 is disposed in the bumper cover 8 to extend in the vehicle width direction. As shown in FIG. 3, the bumper reinforcement 9 is a hollow member having a beam at the center inside. The bumper reinforcement 9 has the front surface 9*a* on the front side and the rear surface 9*b* on the rear side. As shown in FIG. 1 and FIG. 2, the bumper reinforcement 9 is attached to the front ends of side members 11 that are made of a pair of metal components extending in the front-rear direction of the vehicle.

Generally, when a vehicle has a collision, the vehicle tends to collide with a pedestrian or a vehicle which is located on the front side of the vehicle, that is in the advance direction of the vehicle, that is, forward of the vehicle in many cases. In this embodiment, the pressure sensor 4 is arranged on the rear surface 9*b* of the bumper reinforcement 9, such that an impact caused by a collision with a pedestrian or a vehicle ahead of the vehicle is restricted from being directly transmitted to the pressure sensor 4 from the bumper cover 8 which is located on the front side of the vehicle, due to the bumper reinforcement 9.

The pedestrian protection device 10 is, for example, a pop-up hood. The pop-up hood raises the back end of an engine hood immediately after a collision is detected. The clearance between a pedestrian and hard parts such as an engine is increased by the pup-up hood, and the collision energy to a head of the pedestrian is absorbed using the space, such that the shock to the head of the pedestrian is reduced. Instead of the pop-up hood, a cowl air bag may be used, which absorbs an impact applied to a pedestrian by inflating an air bag from the engine hood to the lower part of a front windshield outside of the vehicle.

Next, operations of the collision detection device 1 at a time when a collision is generated are explained. When an object such as pedestrian collides with the front of the vehicle, the bumper cover 8 of the bumper 7 is deformed by the shock caused by the collision with the pedestrian. Then, while the bumper absorber 2 absorbs the shock, the bumper absorber 2 is deformed, and the detection tube component 3 is also deformed at the same time. At this time, a pressure in the hollow part 3*a* of the detection tube component 3 is increased quickly, and a pressure change is transmitted to the pressure sensor 4.

In this embodiment, the detection tube component 3 is disposed in the groove portion 2*a* in the state where the detection tube component 3 has the cove curve portion 31 at the high rigidity part G where the rigidity of the front grille is high and the corner part C of the bumper cover 8, in consideration of a case where the output of the pressure sensor 4 becomes small. Thus, the cross-section area per unit length in the vehicle width direction when seen from the front-rear direction of the vehicle is made larger in the cove curve portion 31 of the detection tube component 3 than that in the horizontal portion 30 by only a predetermined amount. Thus, the output of the pressure sensor 4, at the time of a collision, is raised at the high rigidity part G of the front grille and the corner part C of the bumper cover 8.

Figure 6:
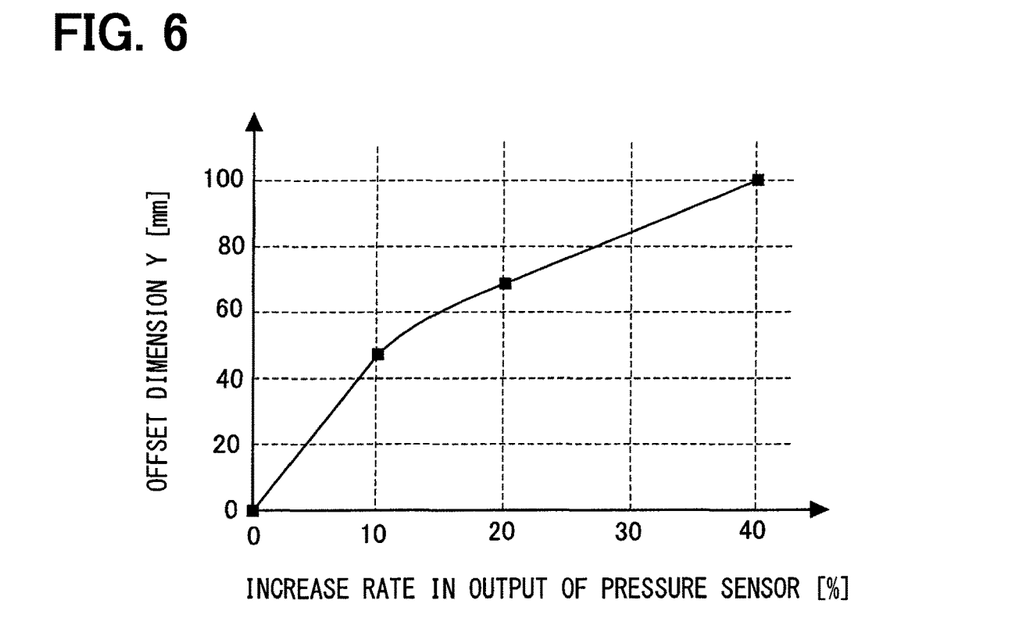
FIG. 6 is a graph illustrating a relationship between an offset dimension of the cove curve portion and an increase rate in output of a pressure sensor.
Figure 7:
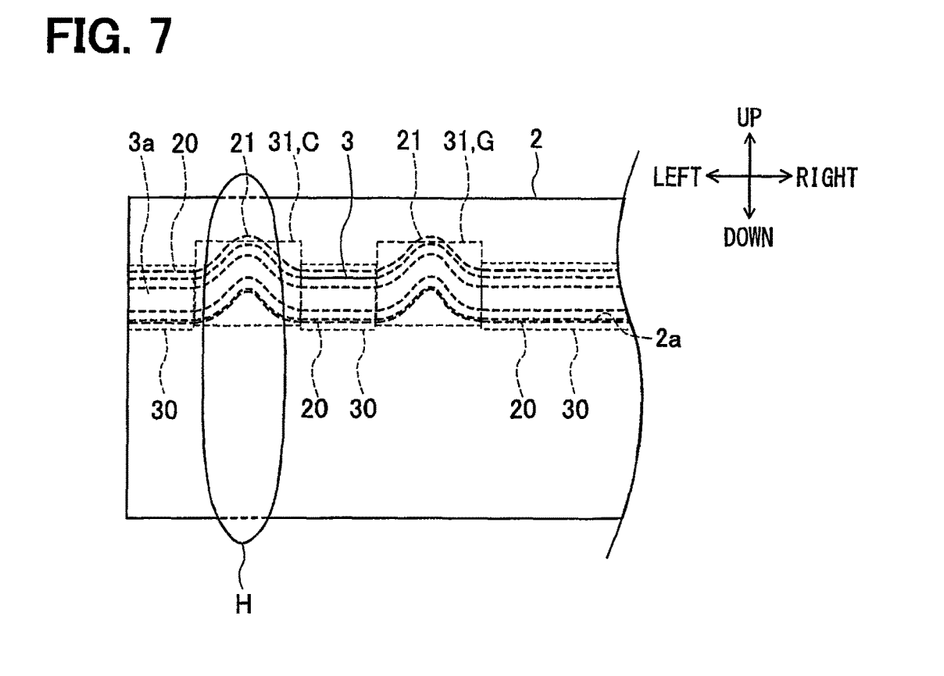
FIG. 7 is a schematic diagram illustrating a situation where the vehicle collides with a pedestrian.

A relation between an offset dimension Y of the cove curve portion 31 and an increase rate in output of the pressure sensor 4 is explained referring to FIG. 6. The "offset dimension" means a length in the vehicle up-down direction from the horizontal portion 30 to the peak (the position most distant from the horizontal portion 30) of the cove curve portion 31. The increase rate in output of the pressure sensor 4 means a rate of increase in the output of the pressure sensor 4 when the offset dimension Y of the cove curve portion 31 is increased by bending the detection tube component 3. An output of the pressure sensor 4 is defined as a standard (namely, 100%) when a predetermined load per unit length in the vehicle width direction is applied to the horizontal portion 30, in other words, in the state where the detection tube component 3 is not curved. Moreover, a length X of the cove curve portion 31 in the vehicle width direction of, i.e., the vehicle left-right direction, is set as about 200 mm.

As shown in FIG. 6, as the offset dimension Y is increased, the increase rate in output of the pressure sensor 4 becomes large. That is, as the offset dimension Y becomes large, the collision area (namely, cross-section area perpendicular to the collision direction) of the cove curve portion 31 of the detection tube component 3 at the time of the collision with the object (pedestrian H) ahead of the vehicle becomes large. Since the deformation amount of the detection tube component 3 (namely, volume crushed by the collision) becomes large, the output of the pressure sensor 4 becomes large (refer to FIG. 7). In this embodiment, the output of the pressure sensor 4 at the time of a collision can be raised due to the cove curve portion 31 of the detection tube component 3.

Moreover, if a vehicle has a comparatively low height, it is assumed that a leg of a pedestrian is raised by the bumper 7 at the time of the collision and that the upper body of the pedestrian falls onto the engine hood. In this case, the shock produced at the upper part of the bumper 7 becomes large, and the bumper cover 8 may be deformed greatly from the upper side to the lower side. In this embodiment, the cove curve portion 31 of the detection tube component 3 is curved to the upper side relative to the horizontal portion 30 extending in the vehicle horizontal direction. For this reason, when the pedestrian collides to the vehicle, if the leg is raised by the bumper 7 and if the upper body falls onto the engine hood, the external force added by the falling body from the upper side of the vehicle can be made to transmit effectively to the detection tube component 3. Since the pressure change in the hollow part 3a of the detection tube component 3 is certainly detected by the pressure sensor 4, the fall of the pedestrian can be certainly detected.

The collision detection ECU 6 of the collision detection device 1 executes a predetermined collision determination process based on the detection result of the pressure sensor 4. In the collision determination process, an effective mass of a collision object is computed, for example, based on the detection result of the pressure sensor 4 and the speed sensor 5. When the effective mass is larger than a predetermined threshold value, it is determined that a collision with a pedestrian is generated. Furthermore, when the vehicle speed is within a predetermined limit (for example, range from 25 km/h to 55 km), it is determined that it is necessary to activate the pedestrian protection device 10 for the pedestrian.

The "effective mass" means a mass computed using the relationship of a momentum and an impulse from the signal detected with the pressure sensor 4 at the time of a collision. When the collision between the vehicle and an object occurs, if the object has a mass different from a pedestrian, the detected value of the pressure sensor 4 changes. For this reason, it becomes possible to distinguish the kinds of the object by setting a threshold value between the effective mass of a human body and the mass of other assumed object. Specifically, the value of pressure detected by the pressure sensor 4 is integrated for a predetermined time period, and the integral value is divided by the vehicle speed detected by the speed sensor 5, such that the effective mass is computed.

$$M=(\int P(t)dt)/V \quad \text{(formula 1)}$$

M represents the effective mass, P represents the detection value by the pressure sensor 4 in a predetermined time period, t represents the predetermined time period (for example, from several milliseconds to tens of milliseconds), and V represents the vehicle speed detected by the speed sensor 5 at the time of collision. It is possible to compute the effective mass using formula $E=\frac{1}{2} \cdot MV^2$ which expresses a kinetic energy E of the collided object. In this case, the effective mass is computed by $M=2 \cdot E/V^2$.

When it is determined that it is necessary to activate the pedestrian protection device 10 for the pedestrian, the collision detection ECU 6 outputs a control signal to operate the pedestrian protection device 10, and the shock to a pedestrian is reduced by the pedestrian protection 10.

As explained above, according to the first embodiment, the collision detection device 1 for a vehicle includes the bumper absorber 2 disposed in the bumper 7 of the vehicle and located at the front side of the bumper reinforcement 9, the detection tube component 3 including the hollow part 3a inside and mounted in the groove portion 2a formed in the bumper absorber 2 to extend in the vehicle width direction, and the pressure sensor 4 which detects the pressure in the hollow part 3a of the detection tube component 3, and detects the collision of the object (i.e., pedestrian) to the bumper 7 based on the pressure sensing result by the pressure sensor 4. The detection tube component 3 is mounted in the groove portion 2a in the state where the detection tube component 3 has at least one or more, e.g., four, of the cove curve portions 31 curved in the up-down direction of the vehicle.

Accordingly, since the detection tube component 3 is mounted in the groove portion 2a in the state where the detection tube component 3 has at least one or more, e.g., four, of the cove curve portions 31 curved in the up-down direction of the vehicle, the collision area (namely, cross-section area perpendicular to the collision direction) of the detection tube component 3 at the time of the collision with the object (namely, the pedestrian H) ahead of the vehicle becomes large, such that the deformation amount of the detection tube component 3 (namely, volume crushed by the collision) can be increased. Thereby, the output of the pressure sensor 4 can be restricted from being varied depending on the collision position in the vehicle width direction of the bumper cover 8. That is, the output of the pressure sensor 4 can be improved at the position where the output of the pressure sensor 4 may become small, by disposing the detection tube component 3 in the groove portion 2a in the state where the detection tube component 3 has the cove curve portion 31. Therefore, collision detection can be performed with high accuracy irrespective of the collision position in the vehicle width direction of the bumper 7.

Moreover, the detection tube component 3 is mounted in the groove portion 2a in the state where the detection tube component 3 has the horizontal portion 30 extending in the vehicle horizontal direction, and the cove curve portion 31 curved to the upper side relative to the horizontal portion 30.

Since the cove curve portion 31 of the detection tube component 3 is curved to the upper side relative to the horizontal portion 30 extending in the vehicle horizontal direction, when a pedestrian collides to a vehicle, if the leg is raised by the bumper 7 and if the upper body falls onto the engine hood, the external force added by the falling body from the upper side of the vehicle can be made to transmit effectively to the detection tube component 3. Since the pressure change in the hollow part 3a of the detection tube component 3 is certainly detected by the pressure sensor 4, the falling pedestrian can be detected certainly and the collision detection accuracy of the collision detection device 1 can be raised.

Moreover, the cross-section area per unit length in the vehicle width direction, when seen from the front-rear direction of the vehicle, is larger at the cove curve portion 31 than at the horizontal portion 30 by only a predetermined amount. Accordingly, at the time of the collision with the pedestrian ahead of the vehicle, since the area to which the external force is added becomes larger at the cove curve portion 31 than at the horizontal portion 30, the output of the pressure sensor 4 can be improved by disposing the cove curve portion 31 at a target position.

Moreover, the groove portion 2a has at least one or more curve groove portions 21 curved in the up-down direction of the vehicle. Since the groove portion 2a has at least one or more, e.g., four in this case, of the curve groove portions 21 curved in the up-down direction of the vehicle, the detection tube component 3 having the cove curve portion 31 can be easily fitted in the groove portion 2a by mounting the detection tube component 3 to the curve groove portion 21.

Moreover, the groove portion 2a has the horizontal groove portion 20 extending in the vehicle horizontal direction, and the curve groove portion 21 curved to the upper side relative to the horizontal groove portion 20. Since the horizontal groove portion 20 extending in the vehicle horizontal direction and the curve groove portion 21 curved to the upper side relative to the horizontal groove portion 20 are formed in the groove portion 2a, the detection tube component 3 can be easily fitted in the groove portion 2a in the state where the detection tube component 3 has the horizontal portion 30 extending in the vehicle horizontal direction and the cove curve portion 31 curved to the upper side relative to the horizontal portion 30.

Moreover, the cross-section area per unit length in the vehicle width direction, when seen from the front-rear direction of the vehicle, is larger at the curve groove portion 21 than at the horizontal groove portion 20 only by a predetermined amount. Since the cross-section area per unit length in the vehicle width direction, when seen from the front-rear direction of the vehicle, is larger at the curve groove portion 21 than at the horizontal groove portion 20 only by a predetermined amount, the cross-section area of the cove curve portion 31 of the detection tube component 3 can be easily made larger than that of the horizontal portion 30 only by a predetermined amount.

Moreover, the detection tube component 3 has the cove curve portion 31 at the position in the vehicle width direction where the load applied to the bumper 7 becomes small at the time of a collision to an object (namely, the pedestrian H). Specifically, the detection tube component 3 has the cove curve portion 31 at the high rigidity part G where the rigidity of the bumper cover 8 and the component (for example, front grille) in the bumper 7 is relatively high, and has the cove curve portion 31 at the corner part C of the bumper 7 inclined to the front-rear direction of the vehicle at the adjacency of the end in the vehicle width direction.

Accordingly, the output of the pressure sensor 4 can be raised by disposing the cove curve portion 31 of the detection tube component 3 at the position in the vehicle width direction where the load applied to the bumper 7 becomes small at the time of a collision to an object (namely, the pedestrian H), for example, at the high rigidity part G where the rigidity of the bumper cover 8 or the front grill is relatively high and the corner part C of the bumper cover 8.

Moreover, the groove portion 2a has the curve groove portion 21 at the position in the vehicle width direction where the load applied to the bumper cover 8 of the bumper 7 becomes small at the time of a collision to an object (namely, the pedestrian H). Specifically, the groove portion 2a has the curve groove portion 21 at the high rigidity part G where the rigidity of the bumper cover 8 and the component (for example, front grille) in the bumper 7 is relatively high, and has the curve groove portion 21 at the corner part C of the bumper cover 8 of the bumper 7 inclined to the front-rear direction of the vehicle at the adjacency of the end in the vehicle width direction.

Accordingly, the detection tube component 3 having the cove curve portion 31 can be fitted in the groove portion 2a by forming the curve groove portion 21 at the position in the vehicle width direction where the load applied to the bumper cover 8 of the bumper 7 becomes small at the time of a collision to the object (namely, the pedestrian H), for example, at the high rigidity part G where the rigidity of the bumper cover 8 or the front grille is relatively high and the corner part C of the bumper cover 8. Thereby, the output of the pressure sensor 4 can be improved at the cove curve portion 31 of the detection tube component 3.

Moreover, the pressure sensor 4 is disposed at two positions, e.g., right-and-left ends of the rear surface 9b of the bumper reinforcement 9, thereby securing redundancy while the pressure change in the detection tube component 3 can be detected with high accuracy. That is, incorrect detection can be prevented. In other words, accurate collision detection can be performed by performing a collision determination using the output of the two pressure sensors 4.

Second Embodiment

Figure 8:
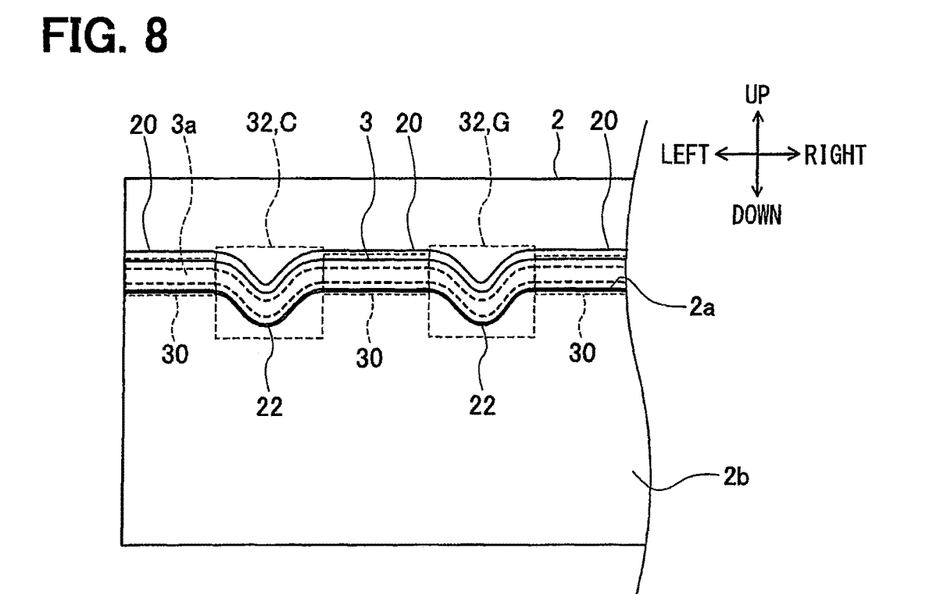
FIG. 8 is a view illustrating a detection tube component, according to a second embodiment, mounted to a groove portion of a bumper absorber seen from a rear side of the vehicle.

A second embodiment is described with reference to FIG. 8. In FIG. 8, the same mark is given to the same portion as the first embodiment to omit the explanation, and only a different portion is explained. In the second embodiment, as shown in FIG. 8, the detection tube component 3 is mounted in the groove portion 2a in the state where a cove curve portion 32 of the detection tube component 3 is curved to the lower side relative to the horizontal portion 30. The groove portion 2a has the horizontal groove portion 20 extending in the vehicle horizontal direction, and the curve groove portion 22 curved to the lower side relative to the horizontal groove portion 20.

Similarly to the first embodiment, the curve groove portion 22 is defined at totally four places, e.g., two of the high rigidity parts G right and left where the rigidity of the front grille is high and two of the corner parts C right and left of the bumper cover 8, and is formed to be curved to the lower side relative to the horizontal groove portion 20. Thus, the output of the pressure sensor 4 can be improved at the time of a collision, at the cove curve portion 32 of the detection tube component 3. In addition, the curvature radius of the curve groove portion 22 and the cove curve portion 32 is set as not less than 15 mm.

According to the collision detection device 1 of the second embodiment, the detection tube component 3 is mounted in the groove portion 2a in the state where the detection tube component 3 has the horizontal portion 30 extending in the vehicle horizontal direction, and the cove curve portion 32 curved to the lower side relative to the horizontal portion 30. Moreover, the groove portion 2a has the horizontal groove portion 20 extending in the vehicle horizontal direction, and the curve groove portion 22 curved to the lower side relative to the horizontal groove portion 20.

Also in the second embodiment, the same effect as the first embodiment can be acquired. Since the cove curve portion 32 of the detection tube component 3 is curved to the lower side relative to the horizontal portion 30, the offset dimension of the cove curve portion 32 can be set larger. That is, in this embodiment, since the horizontal groove portion 20 of the groove portion 2a is formed in the upper side of the rear surface 2b of the bumper absorber 2 (refer to FIG. 3), a space for forming the curve groove portion 22 can be made larger at the lower side of the horizontal groove portion 20 than at the upper side. Therefore, the cross-section area per unit length in the vehicle width direction, when seen from the front-rear direction of the vehicle, can be set larger in the curve groove portion 22.

Third Embodiment

Figure 9:
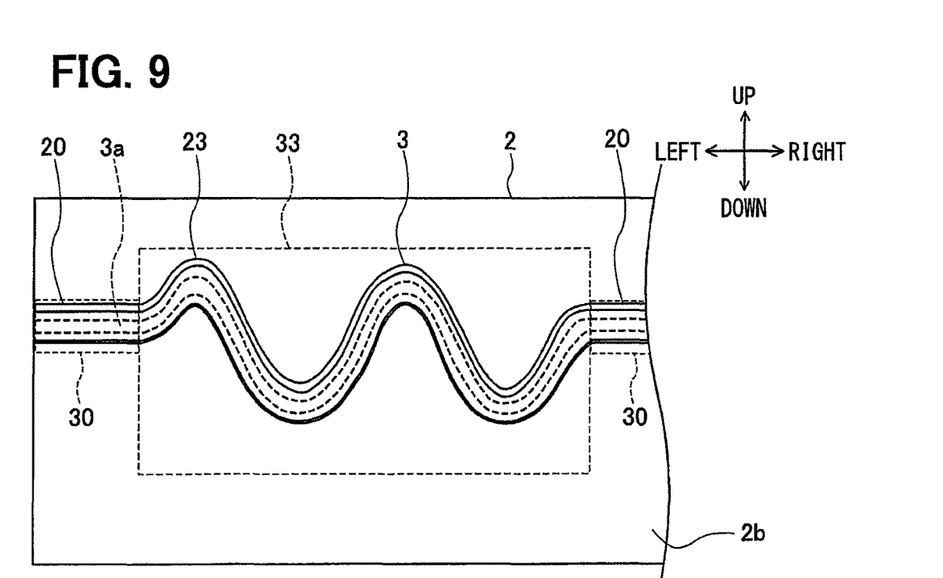
FIG. 9 is a view illustrating a detection tube component, according to a third embodiment, mounted to a groove portion of a bumper absorber seen from a rear side of the vehicle.

A third embodiment is described with reference to FIG. 9. In FIG. 9, the same mark is given to the same portion as the first embodiment to omit the explanation, and only a different portion is explained. In the third embodiment, as shown in FIG. 9, the groove portion 2a has the horizontal groove portion 20 extending in the vehicle horizontal direction, and a curve groove portion 23 curved to the upper side and the lower side relative to the horizontal groove portion 20 to have wave shape. The detection tube component 3 is mounted in the groove portion 2a in a state where the detection tube component 3 has the horizontal portion 30 extending in the vehicle horizontal direction and the cove curve portion 33 curved to the upper side and the lower side relative to the horizontal portion 30.

Specifically, the curve groove portion 23 is formed to be curved in the wave shape from the corner part C adjacent to the end in the vehicle width direction to the high rigidity part G where the rigidity of the front grille is high. The detection tube component 3 can be disposed in the groove portion 2a in the state (namely, in the state of having the cove curve portion 33) where the detection tube component 3 is curved in the wave shape from the corner part C adjacent to the end in the vehicle width direction to the high rigidity part G where the rigidity of the front grille is high, by fitting the detection tube component 3 to the wave-shape curve groove portion 23. In addition, FIG. 9 illustrates a view of the groove portion 2a of the bumper absorber 2 seen from the rear side of the vehicle, at the left end side in the vehicle width direction.

Thus, the deformation amount of the detection tube component 3 (namely, volume crushed by the collision) can be increased effectively by disposing the cove curve portion 33 curved in the wave shape. Thus, the deformation amount of the detection tube component 3 deformed by the external force applied at the time of a collision can be increased at the high rigidity part G of the front grille and the corner part C of the bumper cover 8, such that the output of the pressure sensor 4 can be increased. In addition, the curvature radius of the curve groove portion 23 and the cove curve portion 33 is set as not less than 15 mm.

According to the collision detection device 1 of the third embodiment, the detection tube component 3 is fitted in the groove portion 2a in the state where the cove curve portion 33 is curved to the upper side and the lower side relative to the horizontal portion 30. Also in the third embodiment, the same effect as the first embodiment can be acquired. That is, the collision area of the detection tube component 3 at the time of the collision with the object (namely, the pedestrian H) ahead of the vehicle can be effectively increased by disposing the cove curve portion 33 curved in the wave shape in the vehicle up-down direction, at the position where the output of the pressure sensor 4 may become small in the vehicle width direction. Accordingly, the output of the pressure sensor 4 can be improved more.

Fourth Embodiment

Figure 10:
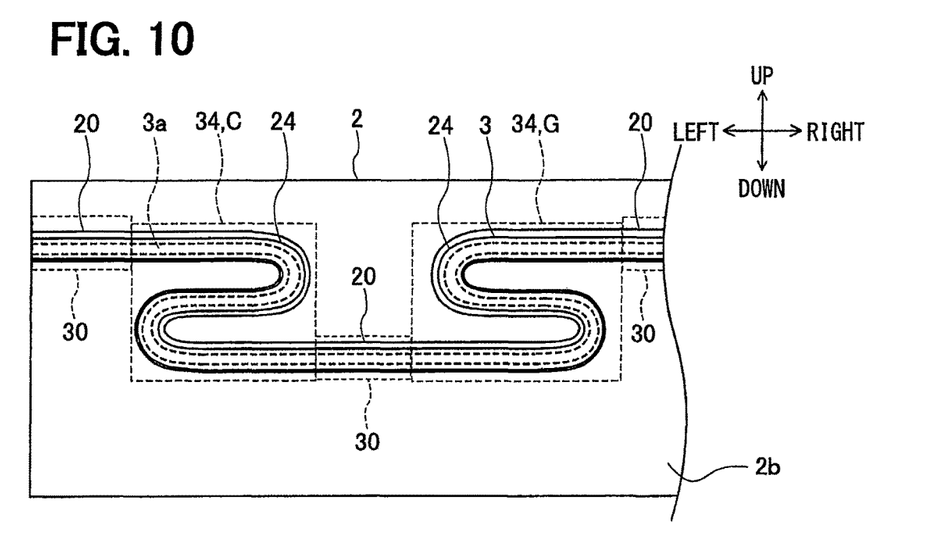
FIG. 10 is a view illustrating a detection tube component, according to a fourth embodiment, mounted to a groove portion of a bumper absorber seen from a rear side of the vehicle.

A fourth embodiment is described with reference to FIG. 10. In FIG. 10, the same mark is given to the same portion as the first embodiment to omit the explanation, and only a different portion is explained. In the fourth embodiment, when seen from the upper side of the vehicle, the detection tube component 3 has plural cove curve portions 34 overlapping with each other.

Specifically, at the corner part C adjacent to the left end of the bumper cover 8 in the vehicle width direction, the curve groove portion 24 curved in reverse-S-shape is formed in the rear surface 2b of the bumper absorber 2 (refer to FIG. 10). Further, at the corner part C adjacent to the right end of the bumper cover 8 in the vehicle width direction, the curve groove portion 24 curved in S-shape is formed (not shown).

Moreover, at the high rigidity part G on the left side in the vehicle width direction where the rigidity of the front grille is high, the curve groove portion 24 curved in S-shape is formed in the rear surface 2b of the bumper absorber 2 (refer to FIG. 10). Further, at the high rigidity part G on the right side in the vehicle width direction, the curve groove portion 24 curved in reverse-S-shape is formed (not shown). Moreover, the horizontal groove portion 20 is formed in the rear surface 2b of the bumper absorber 2 at portions other than the corner part C and the high rigidity part G. In addition, the horizontal groove portion 20 defined between the corner part C and the high rigidity part G is located on the lower side than the horizontal groove portion 20 at the other portions.

The detection tube component 3 is fitted to the curve groove portion 24 such that the detection tube component 3 is disposed in the groove portion 2a in the state where the detection tube component 3 is curved in the S-shape or the reverse-S-shape at the totally four places, e.g., two of the corner parts C right and left of the bumper cover 8 and two of the high rigidity parts G right and left where the rigidity of the front grille is high, that is, in the state where the cove curve portions 34 overlap with each other when seen from the upper side of the vehicle. In addition, FIG. 10 illustrates a view of the groove portion 2a of the bumper absorber 2 seen from the rear side of the vehicle, at the left end side in the vehicle width direction.

According to the collision detection device 1 of the fourth embodiment, the cove curve portion 34 is one of a plurality of cove curve portions 34 overlapping with each other when seen from the upper side of the vehicle. Also in the fourth embodiment, the same effect as the first embodiment can be acquired. That is, the output of the pressure sensor 4 can be improved by increasing the collision area of the detection tube component 3 at the time of a collision with the object (pedestrian H) ahead of the vehicle, since the detection tube component 3 having the cove curve portions 34 is mounted in the curve groove portion 24 of the groove portion 2a at the position where the output of the pressure sensor 4 may become small. Thereby, collision detection can be performed with high accuracy irrespective of the collision position in the vehicle width direction of the bumper 7.

Fifth Embodiment

Figure 11:
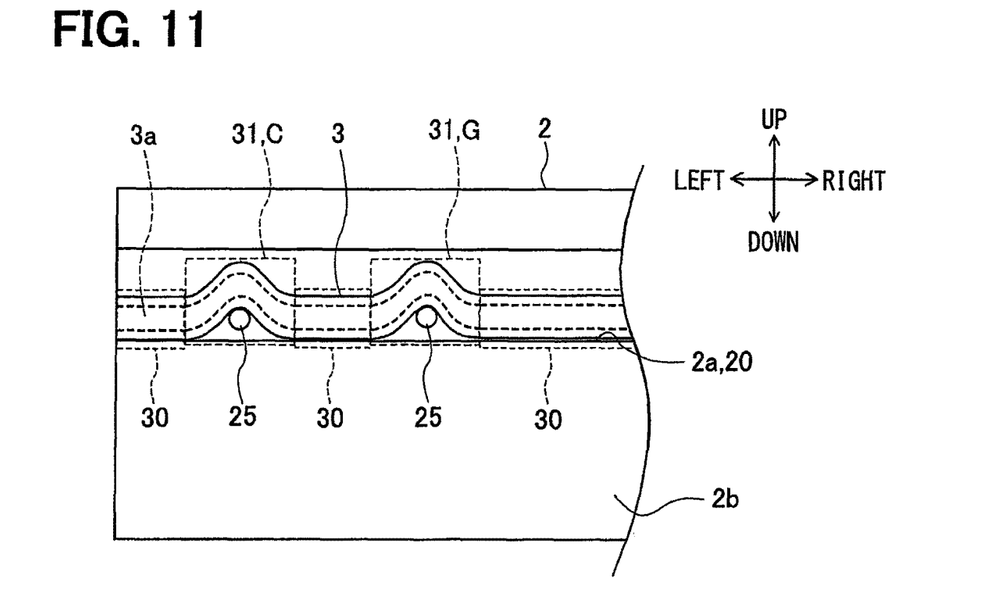
FIG. 11 is a view illustrating a detection tube component, according to a fifth embodiment, mounted to a groove portion of a bumper absorber seen from a rear side of the vehicle.

A fifth embodiment is described with reference to FIG. 11. In FIG. 11, the same mark is given to the same portion as the first embodiment to omit the explanation, and only a different portion is explained. In the fifth embodiment, as shown in FIG. 11, a holding part 25 for holding the detection tube component 3 is formed on the front-side inner wall surface of the groove portion 2a, and is projected to the rear side of the vehicle. Moreover, the groove portion 2a has the horizontal groove portion 20 extending in the vehicle horizontal direction, and does not have the curve groove portion curved to the up-down direction.

The holding part 25 has circle form in the cross-section, and is projected rearward of the vehicle to have a predetermined length, specifically, only by the length of the groove portion 2a in the front-rear direction. The detection tube component 3 is mounted in the groove portion 2a, at the upper side of the holding part 25. The detection tube component 3 is held by the holding part 25, such that the detection tube component 3 is disposed in the groove portion 2a in the state where the detection tube component 3 is curved upward and downward, i.e., in the state where the detection tube component 3 has the cove curve portion 31.

The length of the groove portion 2a in the up-down direction is set longer than the offset dimension of the cove curve portion 31 so that the detection tube component 3 can be mounted in the state where the detection tube component 3 is curved upward and downward. In addition, the offset dimension is the length in the vehicle up-down direction from the horizontal portion 30 to the peak (namely, the position most distant from the horizontal portion 30) of the cove curve portion 31 (refer to FIG. 5).

According to the collision detection device 1 of the fifth embodiment, the groove portion 2a has the holding part 25 projected from the inner wall surface of the groove portion 2a. The detection tube component 3 is mounted in the groove portion 2a in the state of having at least one or more (four in this case) cove curve portions 31 curved in the up-down direction of the vehicle, and is held by the holding part 25 in the groove portion 2a.

Also in the fifth embodiment, the same effect as the first embodiment can be acquired. Furthermore, the detection tube component 3 is held by the holding part 25 without forming the curve groove portion 21 in the groove portion 2a. Thus, the detection tube component 3 with the cove curve portion 31 can be mounted in the groove portion 2a having a simple configuration.

Sixth Embodiment

Figure 12:
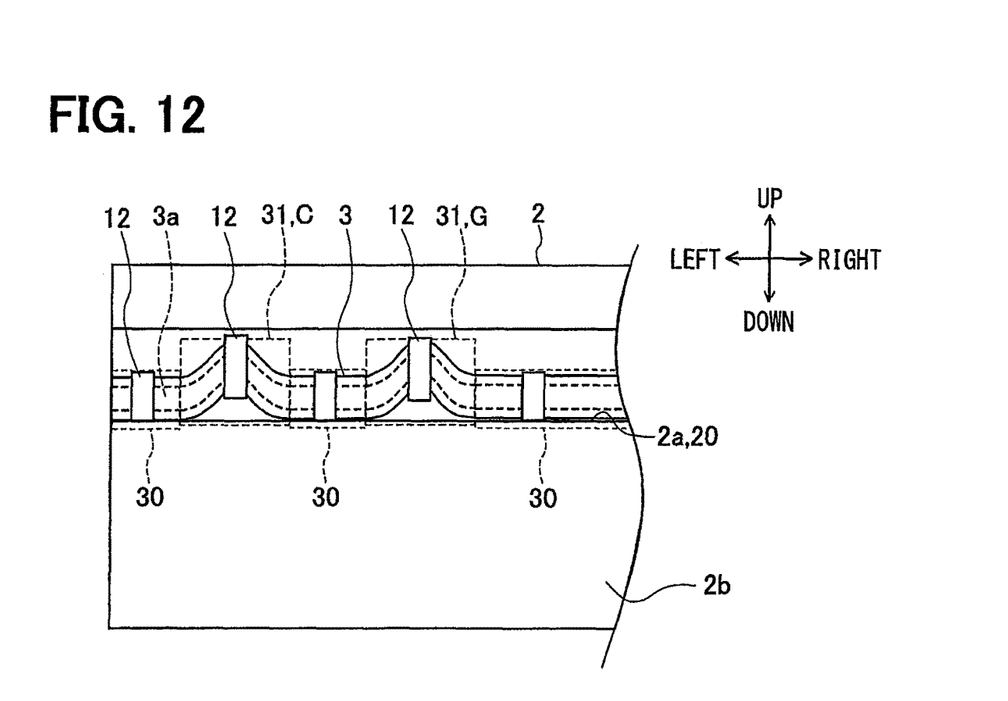
FIG. 12 is a view illustrating a detection tube component, according to a sixth embodiment, mounted to a groove portion of a bumper absorber seen from a rear side of the vehicle.

A sixth embodiment is described with reference to FIG. 12. In FIG. 12, the same mark is given to the same portion as the first embodiment to omit the explanation, and only a different portion is explained. In the sixth embodiment, the detection tube component 3 is held by a holding member 12 in the groove portion 2a, so as to be mounted in the groove portion 2a in the state of having the cove curve portion 31 curved upward and downward of the vehicle. Moreover, the groove portion 2a has the horizontal groove portion 20 extending in the vehicle horizontal direction, and does not have the curve groove portion curved in the up-down direction of the vehicle.

The holding member 12 may be, for example, a band made of rubber. The holding member 12 is one of a plurality of holding members spaced from each other in the vehicle width direction, and is fixed by adhesion to the inner wall surface of the groove portion 2a, while the holding member 12 covers the external surface of the detection tube component 3. Thereby, the detection tube component 3 can be located at a suitable position in the groove portion 2a.

Specifically, the detection tube component 3 is disposed in the groove portion 2a by being held by the holding member 12 in the state where the detection tube component 3 is curved in the up-down direction of the vehicle at plural places. Namely, similarly to the first embodiment, the detection tube component 3 is mounted in the groove portion 2a in the state of having the cove curve portion 31 (refer to the squares surrounded by dashed line in FIG. 12) at totally four places, e.g., two of the high rigidity parts G right and left where the rigidity of the front grille is high and two of the corner parts C right and left of the bumper cover 8.

Moreover, similarly to the fifth embodiment, the length of the groove portion 2a in the up-down direction is set longer than the offset dimension of the cove curve portion 31 so that the detection tube component 3 can be mounted in the state where the detection tube component 3 is curved upward and downward.

According to the collision detection device 1 of the sixth embodiment, the detection tube component 3 is mounted in the groove portion 2a in the state of having at least one or more (four in this case) cove curve portions 31 curved in the up-down direction of the vehicle, and is held by the holding member 12 in the groove portion 2a.

Also in the sixth embodiment, the same effect as the first embodiment can be acquired. Furthermore, the detection tube component 3 is held by the holding member 12 without forming the curve groove portion 21 in the groove portion 2a. Thus, the detection tube component 3 having the cove curve portion 31 can be mounted in the groove portion 2a having a simple configuration.

Other Embodiment

The present disclosure is not limited to the embodiments, and may be variously modified or extended in the range not deviated from the scope of the present disclosure. For example, although the detection tube component 3 has the horizontal portion 30 and the cove curve portion 31-34 in the above embodiment, the horizontal portion 30 may be omitted. Instead of the horizontal portion, the detection tube component 3 may have a slanting portion not parallel to the vehicle horizontal direction. Moreover, the number, the arrangement position, and the curve form of the cove curve portions 31-34 can be suitably set according to the vehicle form and the output characteristic of the pressure sensor 4.

Moreover, in the above embodiments, it is determined that a collision with a pedestrian is generated when the effective mass becomes more than or equal to a predetermined threshold value, in a collision determination process, to require the operation of the pedestrian protection device 10, but is not limited to this. For example, the value of the pressure or the change rate of the pressure detected by the pressure sensor 4 may be used as a threshold value for determining a collision.

Moreover, the pressure sensor 4 is not limited to be attached to the rear surface 9b of the bumper reinforcement 9, and the arrangement position of the pressure sensor 4 can be changed suitably. For example, the pressure sensor may be disposed on the inner wall surface of the bumper reinforcement 9.

What is claimed is:

1. A collision detection device for a vehicle comprising:
a bumper absorber disposed on a front side of a bumper reinforcement in a bumper of the vehicle;
a detection tube component mounted in a groove portion defined in the bumper absorber to extend in a width direction of the vehicle, a hollow part being defined in the detection tube component;
a pressure sensor that detects a pressure in the hollow part of the detection tube component, wherein a collision of an object to the bumper is detected based on a pressure detection result by the pressure sensor,
the detection tube component is mounted in the groove portion in a state where the detection tube component has at least one or more cove curve portions curved in an up-down direction of the vehicle,
the detection tube component has a plurality of horizontal portions extending in a horizontal direction,
the cove curve portion is interposed between the plurality of horizontal portions and curved to at least one side of an upper side and a lower side relative to the plurality of horizontal portions, and
the cove curve portion has one end and an other end in the width direction, the one end being connected to one of the plurality of horizontal portions located adjacent to a center of the detection tube component in the width direction and the other end being connected to an other one of the plurality of horizontal portions located adjacent to an end of the detection tube component in the width direction.

2. The collision detection device according to claim 1, wherein
the cove curve portion has a cross-section area per unit length in the width direction, when seen from a front-rear direction of the vehicle, that is larger than that of the horizontal portion by a predetermined amount.

3. The collision detection device according to claim 1, wherein
the cove curve portion is one of a plurality of cove curve portions overlapping with each other when seen from an upper side of the vehicle.

4. The collision detection device according to claim 1, wherein
the groove portion has at least one or more curve groove portions curved in the up-down direction of the vehicle.

5. The collision detection device according to claim 4, wherein
the groove portion has a horizontal groove portion extending in a horizontal direction of the vehicle, and the curve groove portion curved to at least one side of an upper side and a lower side relative to the horizontal groove portion.

6. The collision detection device according to claim 5, wherein
the curve groove portion has a cross-section area per unit length in the width direction, when seen from a front-rear direction of the vehicle, that is larger than that of the horizontal groove portion by a predetermined amount.

7. The collision detection device according to claim 1, wherein
the detection tube component has the cove curve portion at a position where a load applied to the bumper from the object becomes smaller than an other position in the width direction of the vehicle.

8. The collision detection device according to claim 1, wherein
the detection tube component has the cove curve portion at a position where a rigidity of the bumper and/or a component in the bumper is high relative to an other position.

9. The collision detection device according to claim 1, wherein
the detection tube component has the cove curve portion at a corner part of the bumper that is inclined to a front-rear direction of the vehicle around an end of the bumper in the width direction of the vehicle.

10. The collision detection device according to claim 4, wherein
the groove portion has the curve groove portion at a position where a load applied to the bumper from the object becomes smaller than an other position in the width direction of the vehicle.

11. The collision detection device according to claim 4, wherein
the groove portion has the curve groove portion at a position where a rigidity of the bumper and/or a component in the bumper is high relative to an other position.

12. The collision detection device according to claim 4, wherein
the groove portion has the curve groove portion at a corner part of the bumper that is inclined to a front-rear direction of the vehicle around an end of the bumper in the width direction of the vehicle.

13. The collision detection device according to claim 1, wherein
the groove portion has a holding part projected from an inner wall surface of the groove portion, and
the detection tube component is held by the holding part in the groove portion.

14. The collision detection device according to claim 1, wherein
the detection tube component is held by a holding member in the groove portion.

15. The collision detection device according to claim 1, wherein
the detection tube component further has an other horizontal portion between two of the cove curve portions, and the other horizontal portion is located at a same position as the plurality of horizontal portions in the up-down direction.

16. The collision detection device according to claim 1, wherein a curvature radius of the groove portion and the cove curve portion is greater than 15 mm.

17. The collision detection device according to claim 1, wherein the cove curve portion is curved only to the upper side relative to the plurality of horizontal portions.

18. The collision detection device according to claim 1, wherein the cove curve portion is curved only to the lower side relative to the plurality of horizontal portions.

19. The collision detection device according to claim 1, wherein the detection tube component is curved in an S-shape and a reverse S-shape.

\* \* \* \* \*